United States Patent [19]

Boucher

[11] Patent Number: 5,456,789
[45] Date of Patent: Oct. 10, 1995

[54] APPARATUS FOR AND METHOD OF WRAPPING BOARDS

[75] Inventor: Ronald H. Boucher, Goffstown, N.H.

[73] Assignee: Crathern Engineering Co., Inc., Contoocook, N.H.

[21] Appl. No.: 225,456

[22] Filed: Apr. 7, 1994

[51] Int. Cl.$^6$ ............................................. B26D 5/20
[52] U.S. Cl. .................. 156/354; 156/521; 156/516; 156/517; 156/556; 156/355
[58] Field of Search .................... 156/521, 510, 156/516, 517, 556, 519, 354, 355, 353, 522

[56] References Cited

U.S. PATENT DOCUMENTS

| | | | |
|---|---|---|---|
| 2,958,365 | 11/1960 | Molins et al. | 156/519 |
| 3,311,032 | 3/1967 | Lucas | 156/519 X |
| 3,533,886 | 10/1970 | Staats et al. | 156/510 |
| 3,586,586 | 6/1971 | Berg | 156/521 |
| 4,317,694 | 3/1982 | Fuchs et al. | 156/521 X |
| 4,491,492 | 1/1985 | Hetherington | 156/521 X |
| 4,888,083 | 12/1989 | Sumi et al. | 156/522 X |
| 5,010,999 | 4/1991 | Candore | 156/521 X |
| 5,051,147 | 9/1991 | Anger | 156/355 |
| 5,288,714 | 2/1994 | Marschke | 156/510 X |

*Primary Examiner*—David A. Simmons
*Assistant Examiner*—Steven J. Helmer
*Attorney, Agent, or Firm*—Lappin & Kusmer

[57] ABSTRACT

The invention is an improved apparatus for and method of wrapping boards in which a series of second sheets from a continuous supply roll of elongated sheet material precoated on one surface with an adhesive, are provided after partial lamination to the hitherto unwrapped surfaces of a succession of prewrapped boards and are subsequently completely laminated to such boards. A series of drive rolls move a succession of the prewrapped boards along a feed path to the nip of an anvil and a drive roll where a leading transverse edge of the sheet material adheres in registration to the unwrapped surface of a prewrapped board. A cutting knife severs the sheet material against the anvil to provide a cut portion of the sheet with a trailing transverse edge that will register with the back end of the board. Additional rolls are included for moving the board and adhered cut portion of the sheet away from the anvil and for pressing the board and the cut portion together to insure a positive wrap.

9 Claims, 6 Drawing Sheets

APPARATUS FOR AND METHOD OF WRAPPING BOARDS

This invention relates to board laminating machinery and more particularly to an automatic, roll-fed lining machine.

BACKGROUND OF THE INVENTION

A typical system for manufacturing sheet-wrapped boards, such as paper-board, chipboard and the like, for example to be used in forming multi-ring binders, usually includes a station at which relatively rigid, precut blanks of chipboard or the like are prewrapped on one side with an oversized first sheet, e.g. paper, plastic and the like, the edges of which are turned over the edges of the board and glued down to margins of the opposite side of the blank. The prewrapped blanks are then typically stored on palettes. A plurality of flexible second sheets, typically made of paper, plastic and the like, are provided, having been previously cut in an appropriate configuration usually slightly smaller than the dimensions of the blank so that each sheet will fit over the unwrapped opposite side of a corresponding blank. One surface of each of these second sheets may have been preprinted with a random or repeat pattern. The opposite surface of each of the second sheets is coated with a tacky adhesive. Subsequently, when needed, the paletted blanks are loaded into the hopper of a laminating or lining machine from which they are individually and sequentially ted to a lining station where corresponding ones of the precut, adhesively-coated second wrappers and prewrapped blanks are registered with one another, and the adhesive-coated surface of the second sheet is placed appropriately on the hitherto unwrapped opposite side of a corresponding prewrapped blank so as to cover the unwrapped portion of that opposite side in the registered relation.

A substantial problem encountered using the above-described technique is that it is necessarily operates with second sheets that are precut and presented from a stack one at a time, so tends to be a fairly slow process. To speed up the application of second sheets, it is known to employ a roll laminator that applies a sequence of boards to an elongated web from a roll to provide a chain of boards connected to the same web, thereafter cutting the web between the boards to separate the latter. Cutting the web between the boards after the boards have been adhered to the web can result in an uneven or ragged edge where the cut is made, so may require an additional trimming step. Additionally in such case, the cut ends of the second sheet usually extend either over or are coincident with the edges of the board and cannot readily be trimmed to provide a margin of interior clearance between that edge of the board and the corresponding edge of the sheet, i.e. back from the edge toward the interior of the board.

Another problem encountered with the prior art approach is that it is quite difficult to properly register the edges of the precut second sheet so as to provide a desired preset margin with respect to the edges of the board.

OBJECTS OF THE INVENTION

Accordingly it is a primary object of the present invention to provide apparatus for and a method of providing a solution to the foregoing problems. Another object of the present invention is to provide apparatus for and method of laminating second sheets to the unwrapped side of prewrapped boards that permits higher operating speed at lower cost and with more flexibility in use. Other objects of the present invention are to provide such apparatus and method wherein the second sheets are laminated directly to the unwrapped surface of a prewrapped board from a continuous web which is then cut after at least a portion thereof has adhered to that unwrapped surface of the board.

SUMMARY OF THE INVENTION

To effect the foregoing and other objects, the present invention generally is an improved apparatus for and method of wrapping boards in which a series of second sheets are provided for sequential lamination to the hitherto unwrapped surfaces of a succession or sequence of prewrapped boards, the second sheets being provided from a continuous supply roll of elongated sheet material or webbing precoated on one surface with an adhesive. The apparatus of the present invention includes means such as drive rolls for moving a succession of such prewrapped boards along a feed path to a laminating station where means, including an anvil, are provided for moving a leading transverse edge of a web of sheet material from a supply roll to the laminating station so that at least at least a portion of the precoated surface of the sheet material adjacent the leading edge of the web contacts only and adheres to a portion of the leading board in the feed path at a predeterminedly registered position of that transverse edge with respect to the leading edge of the unwrapped surface of the board. Means, such as a preferably linear knife edge, are provided for cutting the sheet material against the anvil at a predetermined position after the portion of the precoated surface of the sheet material has adhered to the board, so as to provide the cut section of the sheet material with a trailing transverse edge spaced a predetermined distance from the leading edge. That cut also provides a new leading edge to the remainder of the continuous roll of sheet material. Lastly, means are included for moving away from the anvil, the board with cut section of the sheet material adhered at least in part thereto and for pressing the board and the cut section of sheet material together to insure a positive lamination.

In a preferred embodiment, the anvil is formed as an elongated member rotatable about its axis of elongation and having at least two, smooth, metallic, curved surfaces extending parallel to the axis of elongation, each such curved surface having a different radius of curvature so that one of the surfaces is higher than the other, i.e. further from said axis of elongation than the other of said surfaces.

In operation, the web is initially taken from the supply roll as by a vacuum drawn at the surface of the rotatable anvil until the precoated surface of the web adheres to a first board. The web is thereafter also pulled from the supply roll over the anvil by motion of the first board captured between the anvil and a drive roll. As the web is pulled over the higher anvil surface in contact therewith by the motion of the first board captured between the higher surface of the anvil and the drive roll, the knife edge which is disposed parallel to the axis of elongation and movable normally to the line of the edge and reciprocably along a curve tangent with the higher surface of the anvil at substantially the same speed as that higher anvil surface, contacts the anvil at the point of tangency and severs the web. Continued rotation of the anvil brings the lower surface of the anvil adjacent the knife edge, permitting the motion of the knife edge to be reversed so that the knife edge can clear the anvil readily. The combination of board and cut portion of the web adhered to the board is then removed from the anvil and the board and cut portion of web are pressed together to provide complete lamination.

BRIEF DESCRIPTION OF THE DRAWINGS

For a fuller understanding of the nature and objects of the present invention, reference should be had to the following detailed description taken in connection with the accompanying drawings wherein like numerals denote like parts.

DETAILED DESCRIPTION OF THE DRAWINGS

As shown in the drawing, a preferred embodiment of the present invention comprises means, such as driven feed rolls 20 and 22, for driving prewrapped blanks or boards of the type hereinbefore defined successively along a typically substantially horizontal feed path 23 from a hopper or stack 24 of such boards so that their unwrapped surfaces are uppermost. Means are provided for moving from a supply such as a roll (not shown), a continuous, flexible, elongated sheet, strip or web 26, one surface of which is precoated with a layer of adhesive such as a pressure-sensitive glue or the like, so that such precoated surface contacts the uppermost surfaces of boards moving in feed path 23. This latter means comprises rotatable anvil 28, driven roll 30 positioned to form a nip with anvil 28 in which a board can be captured, and a pair of driving rolls 32 and 34. Means, such as board registration element 36, are disposed to be driven along feed path 23 by engagement with the leading edges of successive boards. Element 36 is movable in rotation to disengage from each successive such leading edge so that the latter can be captured by the nip between the anvil and driven roll 30. To insure that the leading edge of a board remains in contact with element 36 until the latter rotates to disengage the board, a pair of driving rolls 38 and 40 are provided. Means, preferably in the form of photoelectric detector 42, are provided for detecting the trailing edge of a board after that board has been captured and is being driven along feed path 23 by engagement with and between driving rolls 32 and 34. Cutting means 44 are provided for cutting web 26 against anvil 28 at a predetermined time. Lastly, a pair of driving press rolls 46 and 48 are provided to aid in quickly removing a board and the cut portion of web 26 attached thereto from between the nip of anvil 28 and roll 30 and for pressing the web portion and board against one another to insure adhesion and complete lamination therebetween.

As will be apparent to those skilled in the art, drive rolls 20, 22, 30, 34, 46 and 48 are typically standard drive rolls of metal coated with rubber or the like for moving sheet material. Because the diameter of roll 32 is too small, no rubber coat is provided. The rolls of each pair such as rolls 46 and 48, 38 and 40, 32 and 34, and 20 and 22 are disposed with axes of rotation parallel to one another and to axes of the other drive rolls. The rolls of each pair are mounted to be resiliently biased toward one another in a direction normal to their axes of rotation. Motor means (not shown) are provided for driving rolls 20, 22, 38 and 40 at substantially the same rotational speeds. Schematically shown rolls 38 and 40 should be considered to include known magnetic clutches serving to couple them to their respective driving motor means so as to permit rolls 38 and 40 to slip when encountering back resistance beyond a predetermined force limit.

In a preferred embodiment, anvil 28 is typically an elongated member rotatable about an axis 50 of elongation disposed substantially parallel to the axes of rotation of the drive rolls. Anvil 28 is provided with at least two smooth curved surfaces extending parallel to axis 50 of elongation, each such curved surface having a different radius of curvature so that one surface 52 is higher (i.e. radially further from axis 50 of elongation) than is other surface 54. As means for releasably securing web 26 to the surface of anvil 28 so that rotation of the anvil advances web 26 from its supply roll, in a preferred embodiment, interior 56 of anvil 28 is a hollow that defines a vacuum plenum communicating with surface 52 through a plurality of small apertures 60, only two of which are shown for simplicity in exposition. Anvil 28 is mounted for intermittent rotation about axis 50 for predetermined angular distances upon command based upon the detection of the trailing edge of a board by detector 42 as will be explained further herein. Other means for releasably retaining the web on the surface of the anvil can be employed, for example friction surfaces and the like.

Board registration element 36 is formed as an elongated, element rotatable in a plane parallel to and intersecting feed path 23 and about an axis 62 of rotation between a first rotational position wherein finger 58 intersects the passage of a board moving along path 23 and a second rotational position at which no part of element 36 intersects path 23. Element 36 is disposed so that axis 62 is substantially perpendicular to feed path 23. In addition, element 36 is mounted to be movable linearly so that axis 62 is will be translated perpendicularly thereto substantially parallel to the feed path 23 between first and second extreme positions. Shoulder or finger 58 is formed adjacent one end of element 36 at a position spaced from axis 62, finger 58 thus extending substantially perpendicularly to feed path 23 so as to be engageable with leading edges of the boards when element 36 has rotated to its first rotational position intersecting feed path 23.

Cutting means 44 typically comprises a cutting mechanism mounted for reciprocable rotation about axis 64 positioned parallel to axis 50 of anvil 28. Cutting means 44 preferably includes elongated blade 66 having a substantially straight knife edge, blade 66 extending radially outwardly from axis 64 parallel to axis 50 of anvil 28. Cutting means 44 is disposed so that the arc of rotation of the knife edge of blade 66 intersects the arc of rotation of higher surface 52 of anvil 28 at a tangent. Because in the preferred embodiment anvil 28 is formed of a hard material such as hardened steel or the like, it therefore also serves as a cutting surface against which blade 66 can perform the severing operation.

Figure 1:
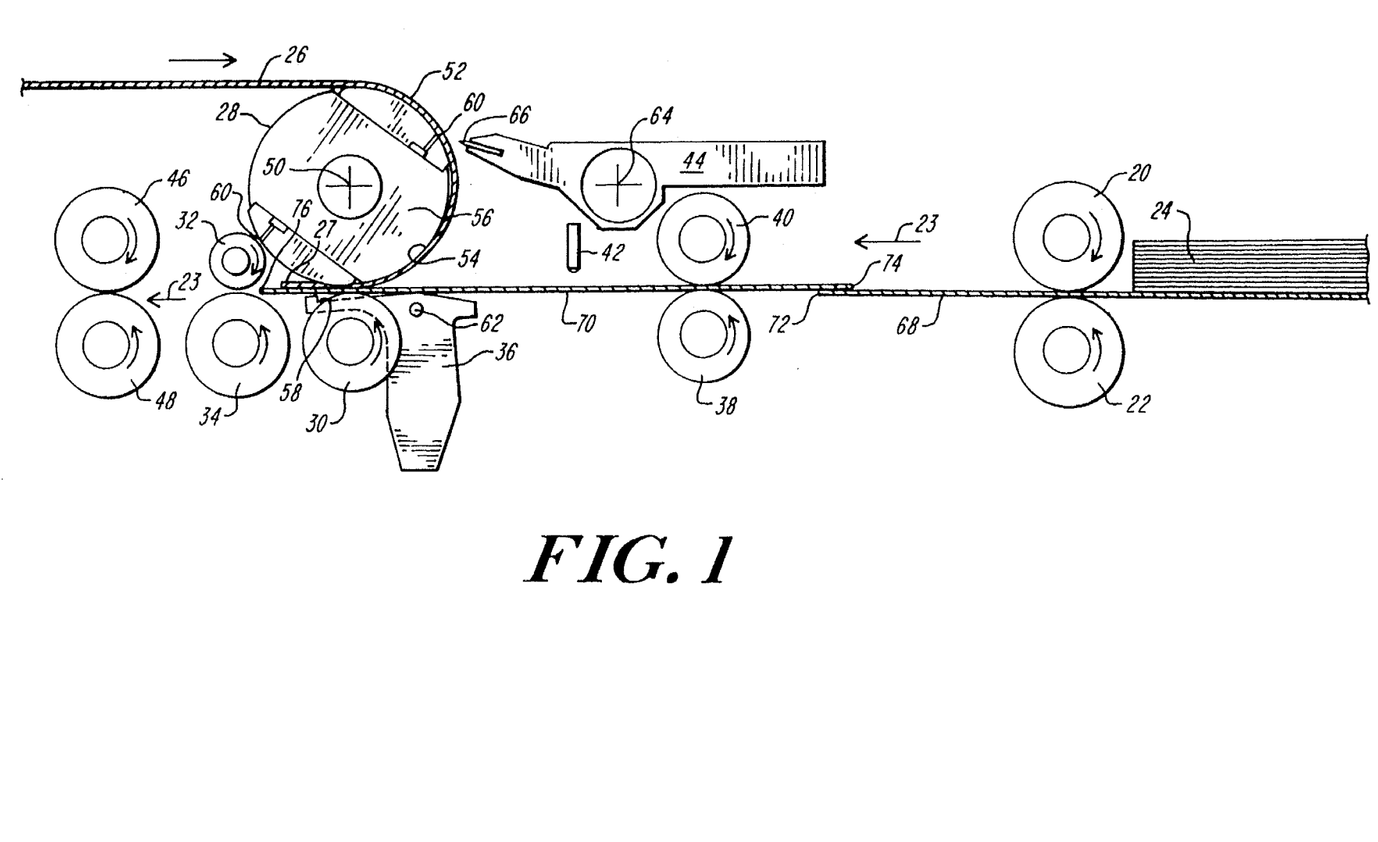
FIG. 1 is a schematic diagram illustrating apparatus embodying the principles of the present invention showing the position of the elements upon juxtaposition of the first board and the continuous roll from which the second sheets will be formed.
Figure 4:
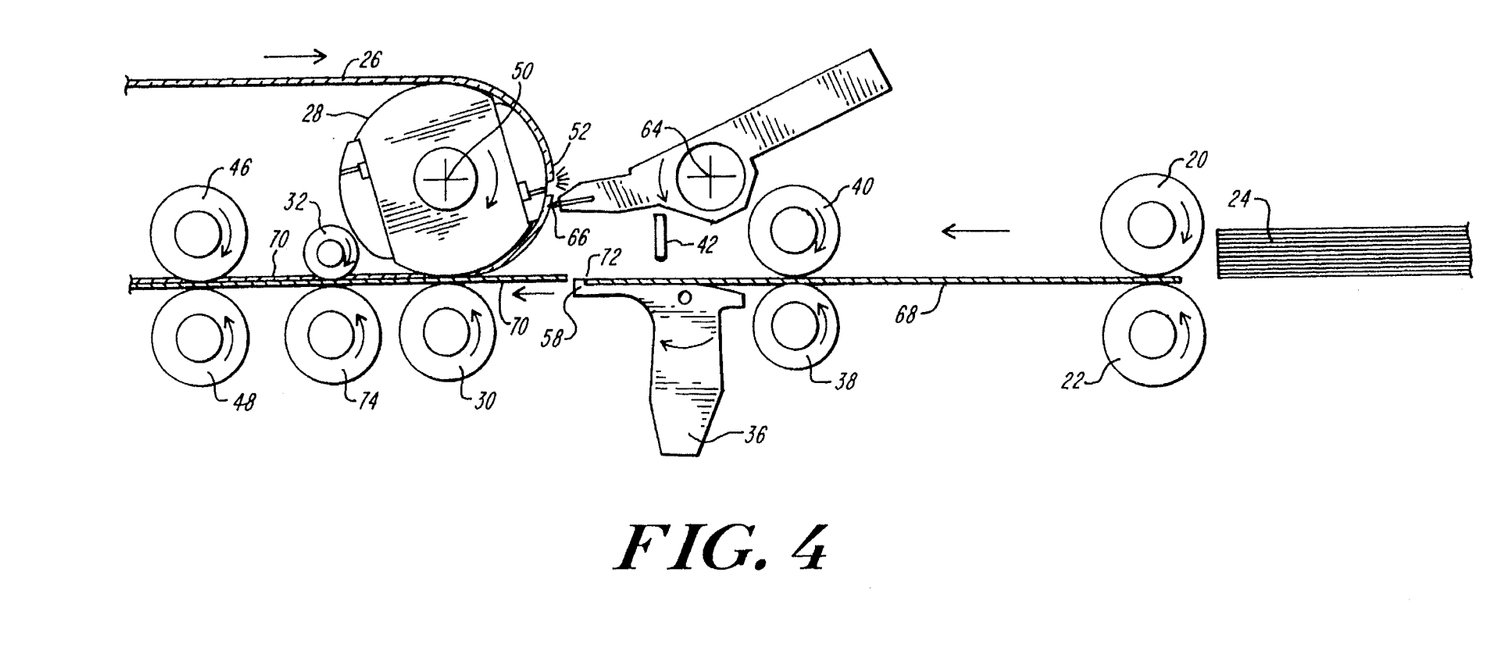
FIG. 4 shows the apparatus of FIG. 1 as the leading edge of the next board fed from the hopper is engaged by the board regulator and the knife severs the roll adhered to the anvil.
Figure 5:
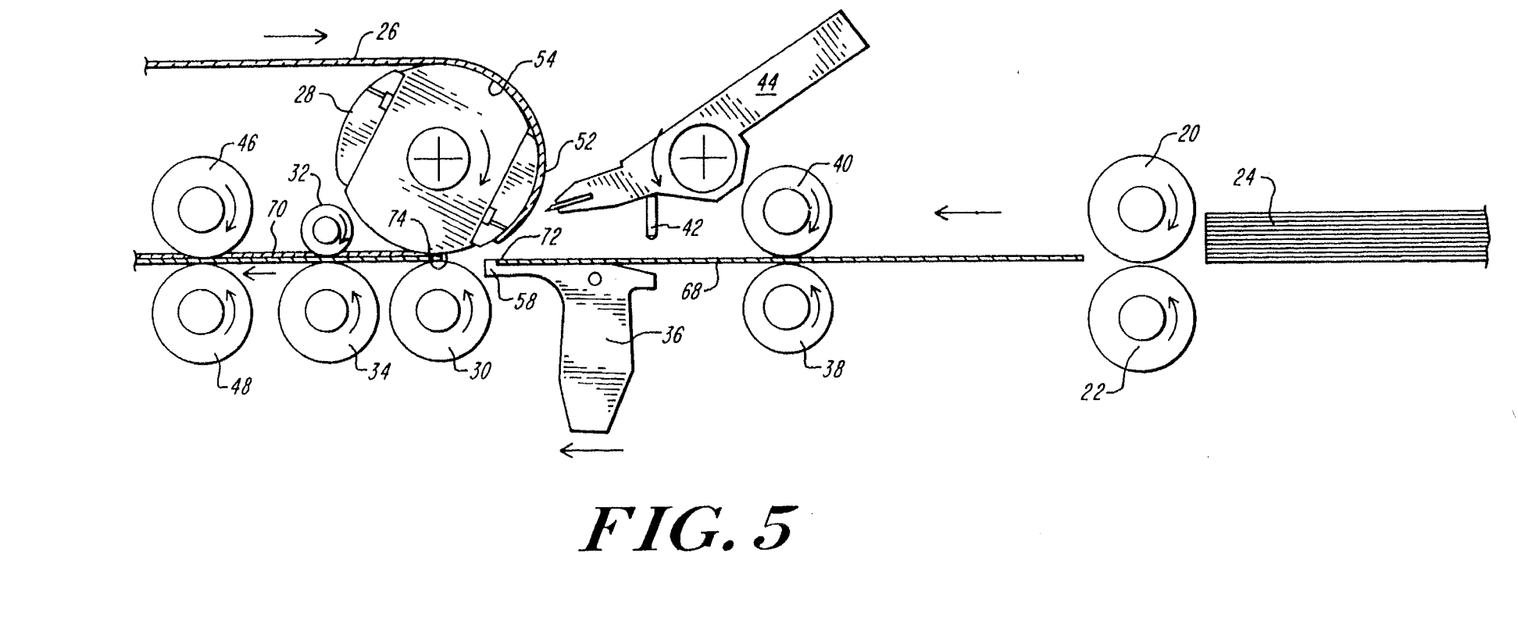
FIG. 5 shows the apparatus of FIG. 1 as the leading edge of the next board fed from the hopper is engaged by the board registration element which itself is driven toward the nip of the anvil and drive roll.
Figure 6:
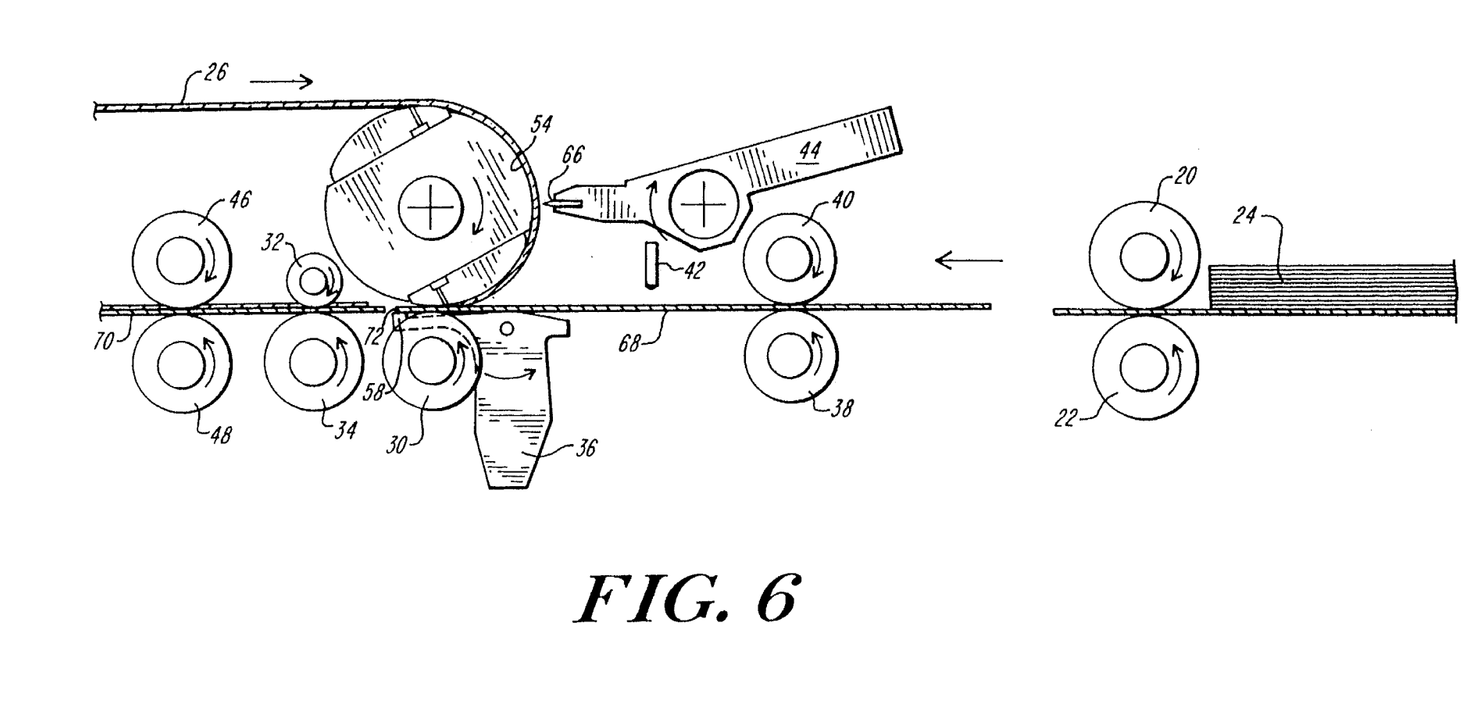
FIG. 6 shows the apparatus of FIG. 1 as the leading edge of the next board is released by the board registration element as the leading edge of the board engages the nip of the anvil and drive roll and the knife is returned to its original position as the anvil presents its lower surface to permit the knife to clear.

In operation of the apparatus of the present invention, a cycle of which is shown in FIGS. 1–6 inclusive, board 68 from the bottom of stack 24 is driven (by a known push mechanism not shown) in horizontal feed path 23 into the nip of driven rolls 20 and 22 with the unwrapped surfaces of the boards facing upwardly, all as shown particularly in FIG. 6. The rotation of rolls 20 and 22 serve to drive board 68 further along feed path 23. As shown in FIG. 1, board 68, driven by rolls 20 and 22, proceeds along the drive path and leading edge 72 thereof slides under trailing edge 74 of the preceding board 70 which is being driven by rolls 38 and 40 such that edge 74 slightly overlaps edge 72. This overlap is created by a difference between the speed with which the two boards, at that point, are proceeding along the feed path, and by the positioning of the nip of rolls 40 and 38 to be slightly higher than the nip of rolls 20 and 22 along path 23. The rotational speeds at which rolls 20 and 22, in engagement with board 68, and rolls 38 and 40 in engagement with board 70, are driven is normally the same. As will be apparent hereinafter however, when the forward progress of preceding board 70 along the feed path is impeded, because rolls 38 and 40 are coupled to their motive source by slip clutches, the rotation of rolls 38 and 40 can be slowed permitting the overlap of the boards in the feed path to occur.

Figure 2:
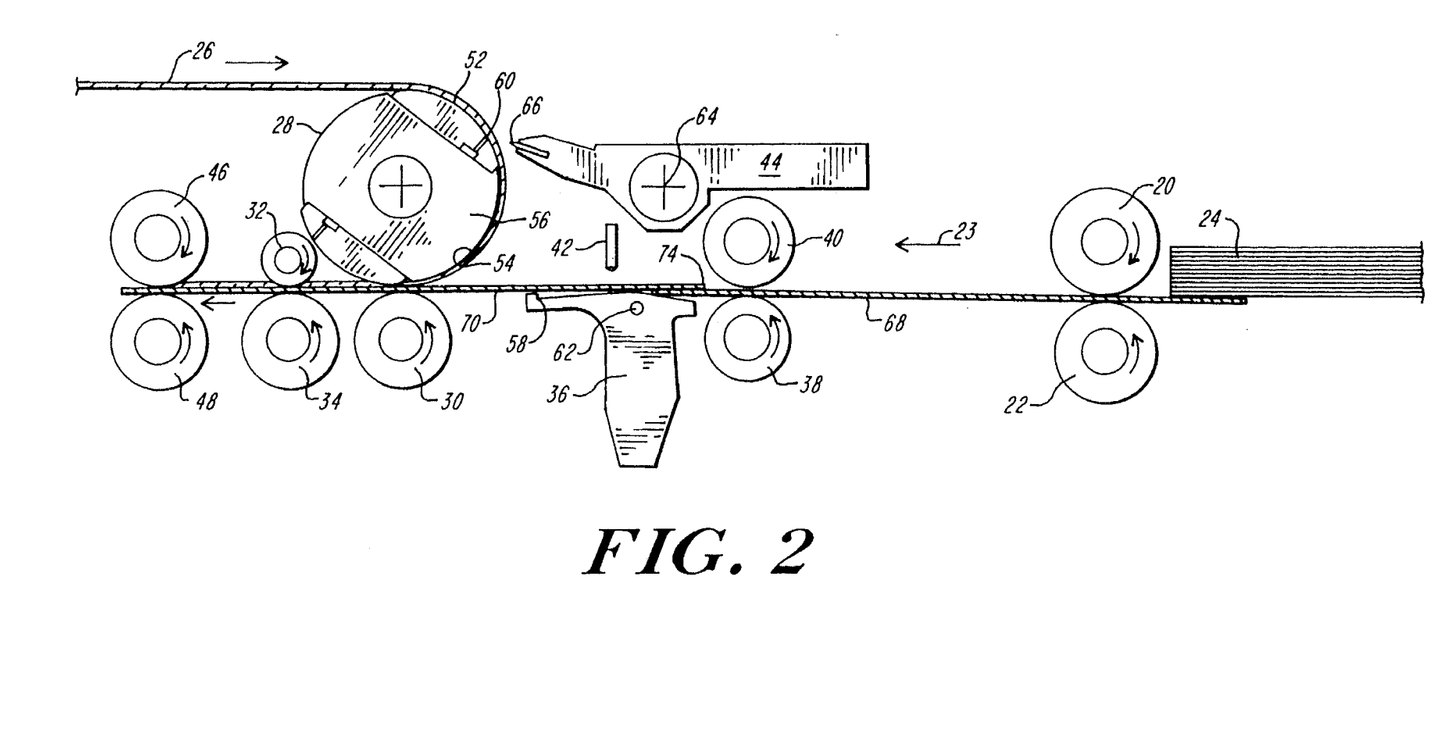
FIG. 2 shows the apparatus of FIG. 1 as the first board and adhered second sheet are driven from the nip of the anvil and a drive roll by a high speed pair of drive rolls.

At this point, the leading edge 76 of board 70 has been moved by rolls 38 and 40 into the nip between anvil 28 and drive roll 30. Because the latter are rotating at a speed slightly less than the normal rotational speed of rolls 38 and 40, the linear motion of board 70 is impeded, causing the board 68 to slide under board 70 so as to overlap as above noted. The continued rotation of anvil 28 however causes lower height surface of the anvil to define an enlarged nip with drive roll 30, releasing the impediment to motion of board 70 along the feed path so that speed of board 70 along the feed path now matches that of board 68, preserving the overlap of the boards. As shown in FIG. 2, leading edge 76 of board 70 is then picked up by the nip of rolls 32 and 34 which are preferably driven at a slightly higher rotational speed than rolls 38 and 40 so the speed of motion of board 70 along the feed path is increased over that of board 68.

Web 26 is releasably held to the curved surfaces of anvil 28 by the vacuum drawn in chamber 56 and the consequent negative pressures arising at apertures 60. Rotation of anvil 28 in a clockwise direction, as shown particularly in FIG. 6, has brought a portion of the adhesively coated surface of web 26 adjacent leading edge 27 of the web into contact with only a corresponding portion of the upper, unwrapped surface of board 68 so that the two adhere to one another at that limited area of contact. The rotation of anvil 28 ceases at a position where the lower surface 54 of anvil 28 opposes thus forming an enlarged nip with roll 30 as shown in FIG. 1. The motion of board 68, pulled by rolls 32 and 34, nevertheless drives board 68 and adhered portion of web 26 through the nip, sliding the web across the surface of now stationary anvil 28.

It should be noted that in FIG. 1, board registration element 36 is in its first extreme translational position wherein it is adjacent roll 30 and also in its second rotational position wherein finger 58 is maintained out of intersection with path 23; cutting means 44 is positioned so that elongated blade 66 is held above the line of intersection of the blade with anvil 28. In the next step of the cycle of operation of the apparatus of the present invention as shown in FIG. 2, anvil 28 and cutting means 44 remain in the same positions as they were in FIG. 1, and board registration element 36 has now been moved to its other extreme translational position adjacent roll 38 but still in its second rotational position. The overlap of boards 68 and 70 has been advanced through the nip of rolls 38 and 40 and the extent of the overlap has been slightly increased due to the disparity in roll speed caused by slippage of the clutches in rolls 38 and 40. Board 70 with the attached end of web 26 has been advanced by drive rolls 32 and 34 into higher speed press rolls 46 and 48.

Figure 3:
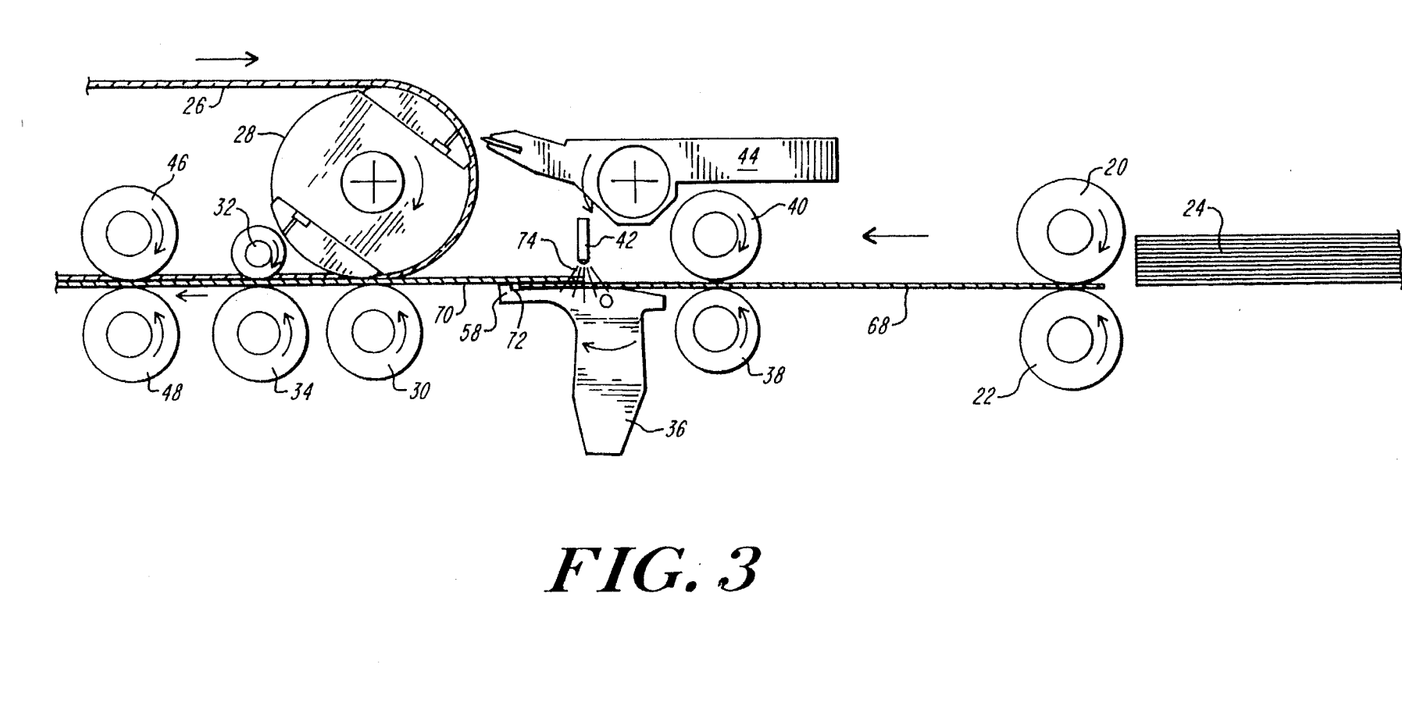
FIG. 3 shows the apparatus of FIG. 1 as the trailing edge of first board is detected.

The continued motion of board 70 draws board 70 to a position at which detector 42 can detect the presence of trailing edge 74, providing a detection signal that triggers rotation of board registration element 36 into its first rotational position so that finger 58 is disposed to engage leading edge 72 of board 68 as shown in FIG. 3. It will be seen there that board 70 has progressed into the nip between press rolls 46 and 48 which are oversped and strongly biased toward one another to provide intimate contact between all parts of the surfaces sandwiching the adhesive layer. The detection signal from detector 42 also triggers the start of rotation of anvil 28 so that it rotates with a surface speed matching that of roll 30, pulling web 26 from its supply. The rotation of anvil 28 is accompanied by a corresponding rotation, in the opposite direction, of cutting means 44 toward anvil 28 and at the same arcuate speed. The opposite rotary motions of cutting means 44 and anvil 28 brings blade 66 into tangential line contact with higher surface 52 of anvil 28, making a crosscut of web 26 as shown in FIG. 4, thereby providing a cut section of web with a precisely located trailing edge and also providing a new leading edge to the remainder of the supply of web 26. Blade 66 continues its motion in a counterclockwise direction as seen in FIG. 4, clearing it out of contact with the anvil and to a displaced position at which the rotation of cutting means 44 is arrested. Board 70 and the now cut section of web 26 adhered thereto is moved at an increased speed along path 23 by rolls 46 and 48 causing the severed or cut section of web 26 to slide along the surface of the anvil and increase the separation between the edges of the cut made by blade 66.

As appears in FIG. 5, continued motion of board 68 under the impetus provided by the rotation of rolls 38 and 40 causes leading edge 72 of board 68 into engagement with finger 58, forcing board registration element to move out of its second extreme translational position toward the first translational position. The separation between the edges of the cut made by blade 66 continues to increase because of the increased speed along path 23 of board 70 by rotation of rolls 46 and 48, and anvil 28 continues to rotate so that higher surface 52 thereof approaches the nip between the anvil and roll 30.

This rotation of anvil 28 brings lower surface 54 to where it faces the cutting position of blade 66, thereby permitting cutting means 44 to rotate in the opposite direction with adequate clearance for blade 66 to return to its original raised position as illustrated in FIG. 1, without engaging the anvil or the web carried thereon. As shown in FIG. 6, the rotation of anvil 28 also brings higher surface 52 to where it again serves to narrow the nip between the anvil 28 and roll 30. The continued driving of board 68 by rolls 40 and 38 forces board registration element 36 into its first extreme translational position at which element 36 rotates into its second rotational position, disengaging leading edge 72 from finger 58 and allowing that leading edge to become engaged between higher surface 52 of anvil 28 and roll 30, commencing another laminating cycle in which the edge of the cut web is laid down on board 68 at a registered location from the leading edge of the latter. Meanwhile, rolls 46 and 48, being strongly biased toward one another, apply substantial pressure to board 70 and the cut section of web 26, sandwiching the adhesive coating on the latter and insuring that the board and cut portion of the web will be firmly and substantially completely laminated to one another.

It will be apparent that by carefully timing the relative rotational speed of the various drive rolls, the anvil and the cutting means, one can provide segments of web 26 that will be, if desired, shorter than the corresponding board so as to lie within the confines of the edges of the latter in predetermined registration with the turned-over margins of the sheet prewrapped on the board. The cooperation hereinbefore described among the various elements of the apparatus during its operation can be provided by simple mechanical linkages, by electrically or pneumatic actuators operated under the control of a simple program effected by relays or a digital computer chip or the like, so the showing thereof has been omitted to avoid prolixity and undue complication in the drawing and description, in the interests of conciseness, and as being well within the skill of the art to provide.

Since certain changes may be made in the above apparatus without departing from the scope of the invention herein involved, it is intended that all matter contained in the above description or shown in the accompanying drawings shall be interpreted in an illustrative and not in a limiting sense.

What is claimed is:

1. Apparatus for wrapping one surface of a preshaped board from a supply of a flexible, elongated continuous web having a surface thereof precoated with adhesive, the other surface and edges of said preshaped board having been prewrapped with a flexible sheet, said apparatus comprising in combination:

means for moving a sequence of said boards along a feed path to a laminating station;

means for moving a leading transverse edge of said continuous web from said supply to said laminating station so that the portion of said precoated surface adjacent said transverse edge of said web contacts and adheres to only a portion of said one surface of one of said boards and is predeterminedly registered with respect to the leading edge of said one board in said path, said means for moving said leading transverse edge of said continuous web from said supply comprising an anvil formed as an elongated member rotatable about its axis of elongation and having at least two curved surfaces extending parallel to the axis of elongation, each such curved surface having a different radius of curvature so that one surface thereof is further from said axis of elongation than the other of said surfaces, said anvil being mounted for intermittent rotation about said axis for predetermined angular distances upon command;

means tier cutting said web at a predetermined position before said precoated surface contacts any of the others of said boards and after said portion of said one surface of said one of said boards adheres to said precoated surface of said web, and means for moving said one said boards with said cut section of said web adhered to said one surface thereof so as to press said one of said boards and said cut section of said web together to insure a complete lamination between them.

2. Apparatus for wrapping as set forth in claim 1, wherein said means for moving a sequence of said boards along said feed path comprises a plurality of drive rolls.

3. Apparatus for wrapping as set forth in claim 1, wherein said curved surfaces are a hard, smooth material.

4. Apparatus for wrapping as set forth in claim 1, wherein said anvil includes means for releasably securing said web to a surface of said anvil so that rotation of said anvil will advance said web from said supply.

5. Apparatus for wrapping as set forth in claim 4, wherein said means for releasably securing said web comprises a vacuum plenum formed in a hollow interior portion of said anvil and means through which said plenum communicates pneumatically with a surface of said anvil.

6. Apparatus for wrapping as set forth in claim 1, wherein said means for moving said portion of the web adhered to said board and for pressing said board and said portion of web together comprise at least a pair of drive rolls operable for moving said board and said portion together at a higher speed along said feed path away from said anvil than said boards are moved along said path toward said anvil.

7. Apparatus for wrapping as set forth in claim 1, including means for detecting the trailing edge of each of said boards successively moved along said feed path;

means for generating a command upon detection of each said trailing edge of each of said boards, said means for cutting said web and said means for moving said leading transverse edge both being responsive to said command so as to provide a cut section of said web with a trailing transverse edge predeterminedly registered with respect to the trailing edge of said one of said boards, and to provide the remainder of said web with another leading transverse edge.

8. Method of wrapping one surface of a preshaped board from a supply of a flexible, elongated continuous web having a surface thereof precoated with adhesive, the other surface and edges of said preshaped board having been prewrapped with a flexible sheet, said method comprising the steps of:

moving a sequence of said boards along a feed path;

coupling a leading transverse edge of said web to one of two surfaces of an elongated anvil rotatable about its axis of elongation, said two curved surfaces extending parallel to the axis of elongation, each such curved surface having a different radius of curvature so that said one surface thereof is further from said axis of elongation than the other of said surfaces;

intermittently rotating said anvil about said axis over a predetermined distance on command so as to move said leading transverse edge of said continuous web from said supply toward said feed path so that only a portion of said precoated surface of said web adjacent said transverse edge contacts only and adheres to a portion of said one of said boards in said feed path and is predeterminedly registered with respect to the leading edge of said one board;

cutting said web against said anvil at a predetermined position before said precoated surface contacts any of the others of said boards and after said portion of said one surface of said one of said boards adheres to said portion of said precoated surface of said web, so as to provide a cut section of said web with a trailing transverse edge predeterminedly registered with respect to the trailing edge of said one of said boards and to provide the remainder of said web with another transverse leading edge; and pressing said one of said boards and said cut section of said web together to insure a complete lamination between them.

9. Apparatus for wrapping one surface of a preshaped board from a supply of a flexible, elongated continuous web having a surface thereof precoated with adhesive, the other surface and edges of said preshaped board having been prewrapped with a flexible sheet, said apparatus comprising in combination:

means for moving a sequence of said boards along a feed path to a laminating station;

means for moving a leading transverse edge of said continuous web from said supply to said laminating station so that the portion of said precoated surface adjacent said transverse edge of said web contacts and adheres to only a portion of said one surface of one of said boards and is predeterminedly registered with respect to the leading edge of said one board in said path, said means for moving said leading transverse edge of said continuous web from said supply comprising an anvil formed as an elongated member rotatable about its axis of elongation and having at least two curved surfaces extending parallel to the axis of elongation, each such curved surface having a different radius of curvature so that one surface thereof is further from said axis of elongation than the other of said surfaces;

means for cutting said web at a predetermined position before said precoated surface contacts any of the others of said boards and after said portion of said one surface of said one of said boards adheres to said precoated surface of said web, so as to provide a cut section of said web with a trailing transverse edge predeterminedly registered with respect to the trailing edge of said one of said boards, and to provide the remainder of said web with another leading transverse edge, said means for cutting said web at a predetermined position comprising an elongated knife blade disposed substantially parallel to said axis of elongation of said anvil and movable reciprocably in a arc transversely of said axis of elongation through a cutting position wherein said are is tangent with said one surface of said anvil;

means for detecting the trailing edge of each of said boards successively moved along said feed path;

means for generating a command upon detection of each said trailing edge of each of said boards;

said means for cutting said web and said means for moving said leading transverse edge both being responsive to said command so as to provide a cut section of said web with a trailing transverse edge predeterminedly registered with respect to the trailing edge of said one of said boards, and to provide the remainder of said web with another leading transverse edge; and means for moving said one said boards with said cut section of said web adhered to said one surface thereof so as to press said one of said boards and said cut section of said web together to insure a complete lamination between them.

* * * * *

UNITED STATES PATENT AND TRADEMARK OFFICE
CERTIFICATE OF CORRECTION

PATENT NO. : 5,456,789
DATED : October 10, 1995
INVENTOR(S) : Ronald H. Boucher

It is certified that error appears in the above-indentified patent and that said Letters Patent is hereby corrected as shown below:

Claim 1, column 7, line 52, delete —tier— and insert "for".

Claim 9, column 10, line 9, delete —are— and insert "arc".

Signed and Sealed this

Second Day of January, 1996

Attest:

BRUCE LEHMAN

*Attesting Officer*     *Commissioner of Patents and Trademarks*